Oct. 28, 1952     T. K. GREENLEE     2,616,013
CONDITION REGULATING APPARATUS

Filed Sept. 17, 1949     2 SHEETS—SHEET 1

INVENTOR.
Theodore K. Greenlee
BY
Carlson, Pitzner, Hubbard & Wolfe
ATTORNEYS

Oct. 28, 1952 T. K. GREENLEE 2,616,013
CONDITION REGULATING APPARATUS
Filed Sept. 17, 1949 2 SHEETS—SHEET 2
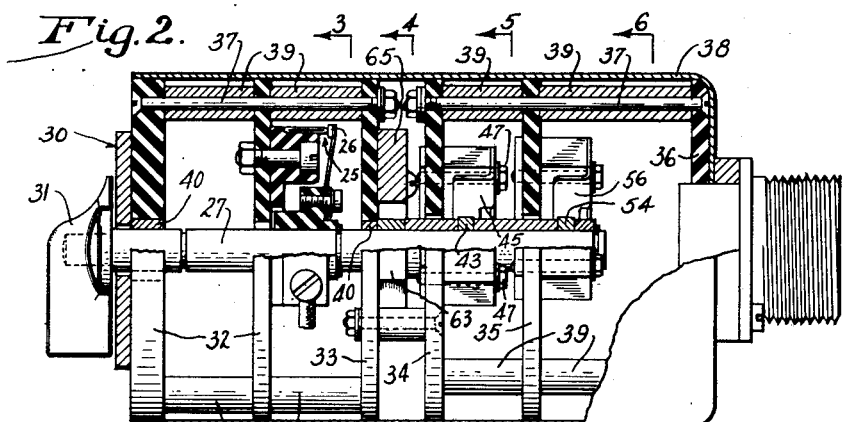
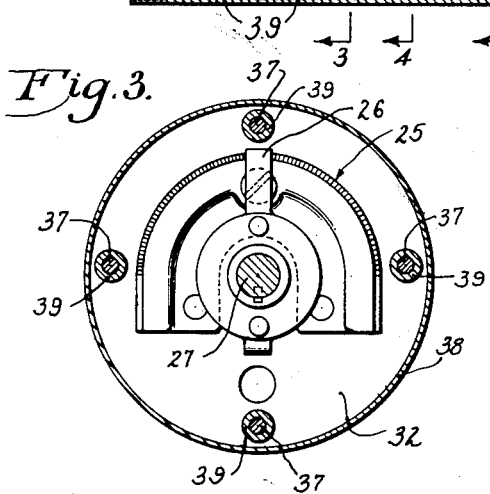
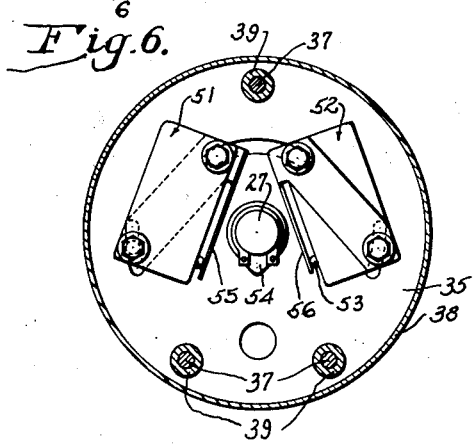
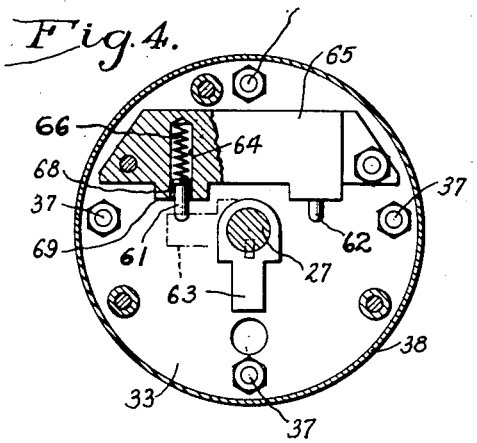
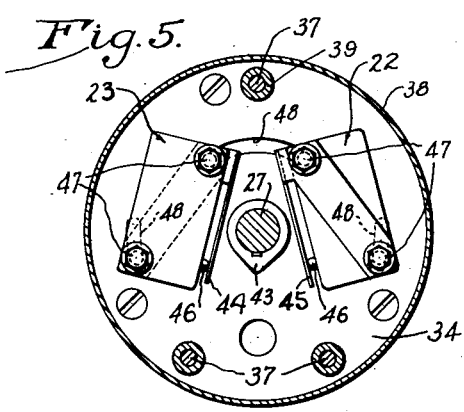
INVENTOR.
Theodore K. Greenlee
BY
ATTORNEYS Patented Oct. 28, 1952

2,616,013

UNITED STATES PATENT OFFICE 2,616,013

CONDITION REGULATING APPARATUS

Theodore K. Greenlee, Rockford, Ill., assignor to Barber-Colman Company, Rockford, Ill., a corporation of Illinois Application September 17, 1949, Serial No. 116,395

8 Claims. (Cl. 201—48).

This invention relates to condition regulating apparatus of the type having a balanced network adapted to control the operation of a reversible power driven operator and including a variable resistance selectively adjustable to vary the effective control point of the network. Control systems of this character ordinarily incorporate auxiliary switches which may be operated independently of the adjuster for the variable resistance to disable the network and establish separate circuits for controlling the power operator.

The primary object of the invention is to dispose the auxiliary control switches in a novel relationship with respect to the adjuster for the variable resistance so that adjustment of the latter and actuation of the switches may be effected by the selective positioning of a single manually movable element.

A more detailed object is to provide a combined resistance and switch unit in which adjustment of the resistance is effected by the movement of a single manually operable element through a predetermined range and the resistance is disabled by movement of the element to either of two predetermined positions at the outer end of the range with separate circuits respectively established by movement of the element to each of two auxiliary positions disposed outwardly beyond the predetermined positions.

A further object is to provide for automatic return of the manually movable element to one of the predetermined positions when the element is released after movement to one of the auxiliary positions.

Other objects and advantages of the invention will become apparent from the following detailed description taken in connection with the accompanying drawings, in which:

Fig. 2 is a side elevation of a combined resistance and switch unit partly in section and broken away in part.

Figure 1:
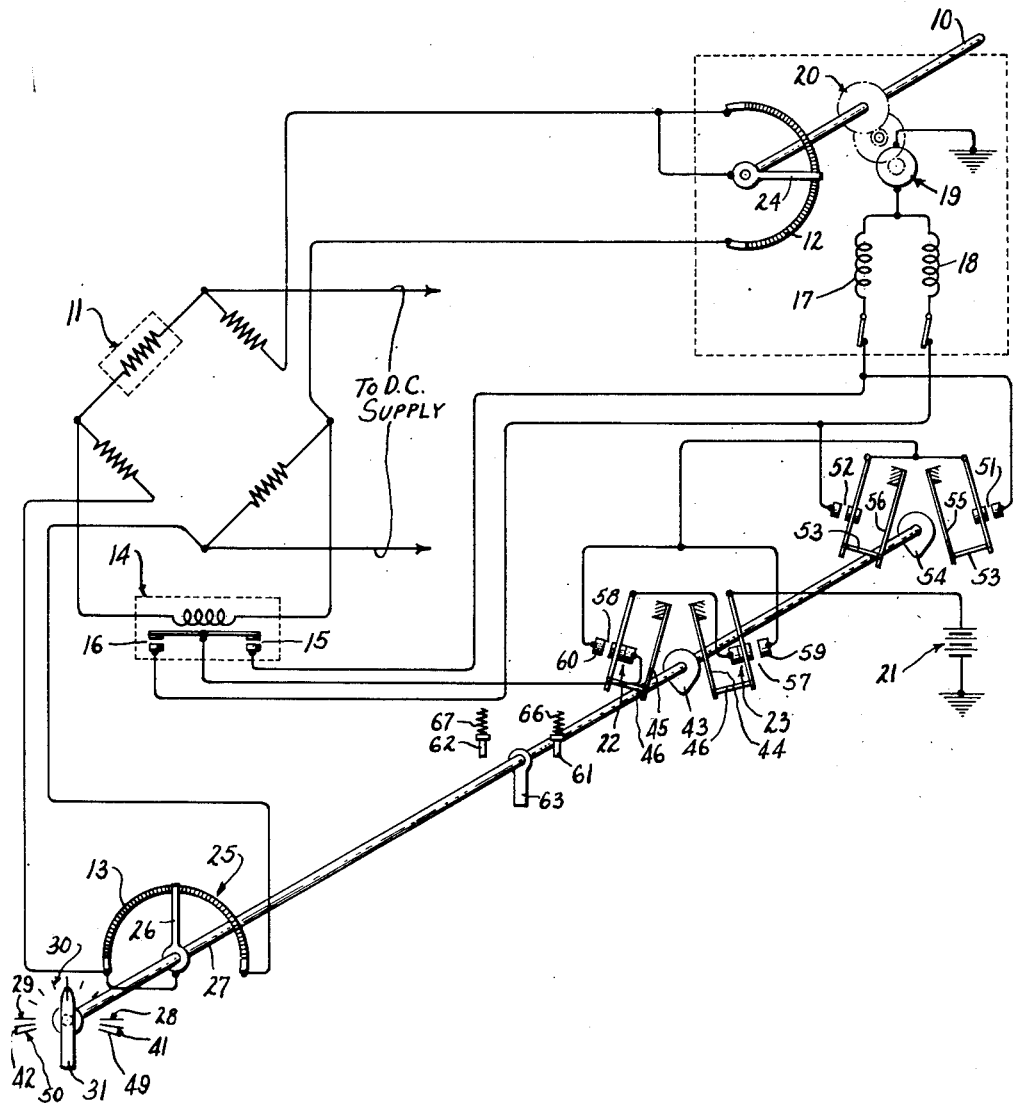
Figure 1 is a schematic view and wiring diagram of condition regulating apparatus incorporating the novel features of the present invention.

Figs. 3, 4, 5, and 6 are sectional views taken respectively along the lines 3—3, 4—4, 5—5 and 6—6 of Fig. 2.

The invention is applicable to the control of various kinds of regulating devices such as valves, dampers, voltage adjusters, etc., for regulating a wide variety of physical, chemical, or electrical conditions. In the drawings, the system shown for purposes of illustration controls the rotary movement of a regulating shaft 10 adapted for connection to a regulating device (not shown) and includes a normally balanced network which is unbalanced in response to a deviation of the controlled condition from a predetermined value and which, when unbalanced, causes a corrective movement of the shaft and the regulating device to restore the condition to the predetermined value. It is to be understood that I do not intend to limit the invention to such typical use nor to the particular kind of control mechanism shown but aim to cover all modifications, alternative constructions, and uses falling within the spirit and scope of the invention as expressed in the appended claims.

In the present instance the network is in the form of a Wheatstone bridge one element of which is a resistance 11 responsive to changes of the controlled condition, herein temperature. Another element of the network includes a selectively adjustable resistance 12 for rebalancing of the bridge after an unbalance thereof due to a deviation of the controlled condition from the predetermined value, and a third element includes a selectively adjustable resistance 13 for varying the effective control point of the network, that is, the predetermined value of the controlled condition at which the network is balanced. To produce a movement of the regulating shaft 10 in response to an unbalance of the network, the latter controls the energization of an electromagnetic relay 14 having two switches 15 and 16 interposed respectively in the circuits for the separate windings 17 and 18 of a reversible electric motor or power operator 19 which is coupled to the shaft 10 through suitable reduction gearing 20.

When the controlled condition deviates from the adjusted control point determined by the adjustment of the resistance 13, for example, to a value above the predetermined value, the bridge is unbalanced and current flows through the relay 14 to close the switch 15. Closing of the latter completes a circuit including a power supply 21, two normally closed switches 22 and 23, the relay switch 15, and the winding 17 of the motor 19 for energizing the latter to turn the shaft 10 and the regulating device and correct for the deviation of the controlled condition. In this corrective movement the resistance 12 is adjusted to rebalance the bridge through the movement in one direction of an arm 24 which herein is fast on the shaft 10, the adjustment being discontinued and the relay deenergized or rendered ineffectual when the network is rebalanced.

Similarly, the other switch 16 of the relay is closed to energize the winding 18 of the motor to correct for a deviation of the controlled condition to a value below the value determined by the adjustment of the resistance 13, the circuit in this case including the power supply, the switches 22 and 23, the relay switch 16, and the winding 18. In this corrective movement, the arm 24 is moved in the opposite direction to adjust the resistance 12 and rebalance the bridge. When the latter is rebalanced, the relay is again rendered ineffectual and the adjustment is discontinued.

The control point of the network may be changed as desired by adjusting the effective value of the variable resistance 13. For this purpose, the latter is a part of a sliding contact rheostat 25 having an arm 26 fast on an element 27 which is manually movable back and forth through a predetermined range defined by two spaced positions 28 and 29, the latter preferably being indicated on a scale 30. In the present instance the movable element is an actuating shaft which may be rotated by manually turning a suitable knob 31.

The rheostat 25, the actuating shaft 27, and various switches by which the motor 19 may be controlled automatically by the balanced network or manually are combined conveniently within a compact unit shown in Fig. 2. Herein this unit includes a framework formed by a plurality of partitions 32, 33, 34, 35, and 36 rigidly connected by bolts 37 and disposed within a removable enclosing casing 38. Suitable spacers 39 are interposed between the partitions to space the same properly along the shaft. The partitions 32 and 33 support bearings 40 in which spaced portions of the shaft are journaled, the actuating knob 31 being carried on one end of the shaft which projects outside of the casing.

Provision is made for rendering ineffectual the control of the balanced network over the motor operator in response to movement of the actuating shaft 27 to either one of two predetermined disabling positions 41 and 42 one of which is disposed outwardly beyond each of the spaced positions 28 and 29. Such disabling of the network is effected by the same manual operator which adjusts the variable resistance 13 but by a movement of such operator through a different range than the control point adjustment. While the disabling may be accomplished in various ways, it is produced herein through the medium of the normally closed switches 22 and 23 above referred to which are actuated by a cam 43 fast on the actuating shaft 27 and acting on follower arms 44 and 45.

The disabling switches 22 and 23 are arranged in series relation in the circuit between the magnetic relay and the power supply 21 so that when either switch is opened, the balanced network is rendered ineffectual to control the movement of the regulating device. In the present instance, the switches are of the self-contained type each having an actuator pin 46 and secured to the partition 34 by bolts 47 which are movable in slots 48 in the partition to facilitate adjustment of the position of the actuating pins relative to the follower arms 44 and 45.

The latter are mounted on the outside of the self-contained switch casings and are so positioned with respect to the actuator pins 46 of the disabling switches that, when the shaft is moved to one disabling position 42, the cam 43 acts upon the arm 44 which in turn acts against one of the actuator pins to urge the movable contact away from the fixed contact of the switch 23 and thereby open the latter to render the bridge ineffectual. Similarly, when the shaft is turned to the other disabling position 41 the cam urges the other follower arm 45 against the actuator pin to move the movable contact of the other disabling switch 22 away from the fixed contact thereof for opening this switch. The shaft when turned to either one of the disabling positions is frictionally retained therein. Therefore, the network remains disabled until the shaft is manually moved back into the range between the spaced positions 28 and 29 in which range the bridge circuit again controls the operation of the motor 19.

In systems of the above character, it is frequently desirable to provide an auxiliary manual control for the motor 19 so that the regulating device may be moved back and forth in either direction independently of the automatic control by the balanced network. The present invention contemplates the provision of such an auxiliary control which is operable in response to movement of the control point adjuster or shaft 27 to either one of two auxiliary or limit positions 49 and 50 disposed outwardly beyond the disabling positions 41 and 42 so that the position of the regulating device may be selectively controlled either automatically or manually by means of a single manually movable operator. For this purpose, one of two normally open auxiliary switches 51 and 52 is included in a separate circuit for each of the motor windings 17 and 18 and is adapted to be closed in response to movement of the shaft to each of the limit positions. These switches are also of the self contained type each having an actuator pin 53 and adjustably mounted on the partition 35 in a manner similar to the mounting of the disabling switches.

Closure of the auxiliary switches 51 and 52 is effected in the present instance by a second cam 54 fast on the shaft 27 and follower arms 55 and 56 positioned with respect to the cam and the actuator pins 53 of the switches in a manner similar to the positioning of the other follower arms 44 and 45 with respect to the other cam 43 and the actuator pins 46 of the disabling switches 22 and 23. Thus, when the shaft is turned to one limit position 49, the cam 54 urges the follower arm 56 against the actuator pin in a direction to close the contacts of the switch 52 and complete a circuit through the winding 18 of the motor for moving the regulating device in one direction. Similarly, turning of the shaft through the range between the spaced positions 28 and 29 into the other limit position 50 causes the cam to urge the other actuating follower arm 55 against the actuator pin in a direction to close the contacts of the other auxiliary switch 51 for completing a circuit through the other motor winding 17 and moving the regulating device in the opposite direction.

To avoid energization of both of the windings 17 and 18 of the motor simultaneously and possible damage to the latter, an electrical interlock including two normally open switches 57 and 58 is interposed between the magnetic relay 14 and the motor windings with both the relay and the windings energized from the same power supply 21. The interlocking switches are enclosed within the casings of the self-contained switches 22 and 23 and comprise fixed contacts 59 and 60 which are respectively positioned to coact with the different movable contacts of the disabling switches in such a manner that when either of the follower arms 44 and 45 and the associated movable contact are urged by the cam 43 in a direction to open one of the disabling switches, the associated interlocking switch is closed in the same movement. Thus, with the disabling switches interposed in series relation between the power supply and the relay and the interlocking switches interposed in parallel relation between the power supply and the auxiliary switches 51 and 52, as shown, the circuits from the power supply to the windings may be completed by closing the auxiliary switches only after the circuit from the power supply to the relay has been broken, thereby insuring that one winding may not be energized automatically through the relay at the same time that the other winding is energized manually through one of the auxiliary switches.

To insure that the regulating device will be moved directly by the auxiliary control only when the shaft 27 is manually retained in one of the limit positions 49 and 50, the invention also contemplates the provision of means for yieldably resisting movement of the shaft into each of these positions and automatically returning the shaft to the adjacent disabling position upon manual release of the same. Herein, this is accomplished by yieldable stops 61 and 62 (see Fig. 4) which are respectively positioned in a novel manner to engage the sides of an arm 63 fast on the shaft 27 in the movement of the latter from the different disabling positions into either of the limit positions. The stops are formed as pins axially slidable in recesses 64 in a supporting member 65 which is bolted to the partition 33. Coiled springs 66 and 67 act on the inner ends of the pins and urge the same outwardly, the outward movement being limited by the engagement of shoulders on the inner pin ends with sleeves 68 pressed into the outer ends of the recess.

One pin 61 is so positioned with respect to the arm 63 that when the knob 31 is turned to move the shaft in a clockwise direction as viewed in Fig. 4 to the disabling position 42, the arm is moved into engagement with the outer tip of the pin as shown in phantom in the same figure. Further movement of the shaft from this position into the limit position 50, causes the arm to push the pin 61 into the recess 64 against the action of the spring 66 therein until the arm engages a projection 69 on the supporting member. In this motion, the spring is compressed so that upon manual release of the control knob, the pin is urged by the spring outwardly against the arm until the shouldered inner end of the pin engages the ring 68 and the shaft is moved back into the disabling position.

The operation of the other pin 62 is similar in resisting movement of the shaft 27 in a counterclockwise direction from the other disabling position 41 into the limit position 49 and returning the shaft to the disabling position upon manual release of the control knob. As pointed out above, the shaft is held frictionally in either disabling position.

When the parts are in the position shown in Fig. 1, the motor 19 is under the automatic control of the balanced network. At that time the control point of the network may be adjusted by moving the arm 26 back and forth across the variable resistance 13.

If it is desired to withdraw the motor from automatic control at any time, this may be accomplished by moving the shaft 27 to either one of the disabling positions 41 and 42. In this movement, one of the disabling switches 22 and 23 is opened to render the magnetic relay 14 ineffectual for energizing the motor.

If operation of the motor by manual control is desired, this may be effected by turning the shaft 27 beyond the disabling positions to one of the limit positions 49 and 50, the direction of operation of the motor being determined by the particular limit position to which the shaft is turned. Such turning of the shaft is permitted by yielding of the stops 61 and 62. Thus, by turning the shaft in a clockwise direction to the limit position 49, the winding 18 is energized and the motor operates in the same direction as it would operate if the control point of the network were changed by turning the shaft in a clockwise direction between the spaced positions 28 and 29. The winding 18 remains energized as long as the shaft is held in the limit position 49. Upon manual release of the knob 31, the spring 67 urges the shaft back into the disabling position 41 but short of the position in which the variable resistance 13 is engaged by the arm 26.

A similar action occurs at the other end of the range. That is to say, if it is desired to energize the winding 17 manually for operating the motor in the opposite direction, the knob 31 is turned to move the shaft 27 to the other limit position 50 beyond the other disabling position 42 for closing the switch 51. This movement of the shaft is resisted by the other yieldable stop 61. When the switch 51 is closed the motor operates in the same direction as it would operate if the control point of the network were adjusted by moving the shaft in a counterclockwise direction between the spaced positions 28 and 29. Upon manual release of the knob, the shaft 27 is urged by the spring 66 back into the disabling position 42 but short of the predetermined position 29.

From the foregoing it is apparent that the condition regulating device may be controlled either automatically or manually by selectively turning a single manually rotatable shaft. With only one control knob for selectively positioning the regulating device, less attention is required on the part of the operator. Also, the number of parts, and therefore the cost, is reduced and all of the parts may be housed in a single compact unit. Through the provision of the yieldable stops 61 and 62 the regulating device may be moved by the auxiliary control only when pressure is exerted against the force of the springs 66 and 67 by manually retaining the actuating shaft 27 in one of the limit positions 49 and 50.

I claim as my invention:

1. In a condition regulating system, the combination of a shaft manually rotatable in opposite directions through a predetermined range between two angularly spaced positions, a variable resistance having an element fixed to said shaft and operable in the movement of the shaft between said spaced positions to increase the effective value of the resistance when the shaft is turned in one direction and to increase the effective value of the resistance when the shaft is turned in the opposite direction, two normally closed switches, means actuated by said shaft and operable to open the respective switches in response to movement of said shaft to predetermined positions disposed outwardly beyond said spaced positions, a pair of normally open switches, means on said shaft operable in the movement of the latter to one limit position outwardly beyond one of said predetermined positions to close one of said normally open switches and in the movement of the shaft outwardly beyond the other of said predetermined positions to close the other normally open switch, and stops yieldably opposing the movement of said shaft outwardly beyond said predetermined positions and operable when said shaft is released to return the shaft to one of said predetermined positions.

2. The combination of a member manually movable in opposite directions between two spaced positions, a variable resistance having an element movable with said member and operable in the movement of the member between said positions in one direction to increase the effective value of the resistance and in the opposite direction to decrease the effective value of the resistance, two normally closed switches, means actuated by said member and operable to open the respective switches in response to movement of the member to predetermined positions disposed outwardly beyond said spaced positions, a pair of normally open switches, means on said member operable in the movement of the member to one limit position outwardly beyond one of said predetermined positions to close one of said normally open switches and in the movement of the member outwardly beyond the other of said predetermined positions to close said other normally open switch, and means yieldably opposing the movement of said member outwardly beyond said predetermined positions and operable when said member is released to return the member to one of the predetermined positions.

3. The combination of a member manually movable in opposite directions in a range defined by two spaced positions, a variable resistance having an element movable with said member and operable in the movement of the member between said positions in one direction to increase the effective value of the resistance and in the opposite direction to decrease the effective value of the resistance, said element being rendered ineffective to vary said resistance in response to movement of said member in either direction outwardly beyond said spaced positions, a pair of normally open switches, means on said member operable in the movement of the member to one limit position outwardly beyond one of said spaced positions to close one of said normally open switches and in the movement of the member outwardly beyond the other of said spaced positions to close said other normally open switch, and means yieldably opposing the movement of said member into each of said limit positions and operable when said member is released to return the member to a position short of said range.

4. In a condition regulating system, the combination of a shaft manually rotatable in opposite directions through a predetermined range between two angularly spaced positions, a variable resistance having an element fixed to said shaft and operable in the movement of the shaft between said spaced positions to increase the effective value of the resistance when the shaft is turned in one direction and to decrease the effective value of the resistance when the shaft is turned in the opposite direction, two normally closed switches, means actuated by said shaft and operable to open the respective switches in response to movement of said shaft to predetermined positions disposed outwardly beyond said spaced positions, a pair of normally open switches, and means on said shaft operable in the movement of the latter to one limit position outwardly beyond one of said predetermined positions to close one of said normally open switches and in the movement of the shaft outwardly beyond the other of said predetermined positions to close the other normally open switch.

5. In a condition regulating system, the combination of a shaft manually rotatable in opposite directions through a predetermined range between two angularly spaced positions, a variable resistance having an element fixed to said shaft and operable in the turning of the shaft between said spaced positions to increase the effective value of the resistance when the shaft is turned in one direction and to decrease the effective value of the resistance when the shaft is turned in the opposite direction, two normally closed switches, means actuated by said shaft and operable to open the respective switches in response to movement of the shaft to either one of two predetermined positions, a pair of normally open switches, and means on said shaft operable in the turning of the latter to one limit position outwardly beyond one of said spaced positions to close one of said normally open switches and in the turning of the shaft outwardly beyond the other of said spaced positions to close the other normally open switch.

6. The combination of a member manually movable in opposite directions between two spaced positions, a variable resistance having an element movable with said member and operable in the movement of the member between said positions in one direction to increase the effective value of the resistance and in the opposite direction to decrease the effective value of the resistance, two normally closed switches, means actuated by said member and operable to open the respective switches in response to movement of the member to predetermined positions disposed outwardly beyond said spaced positions, a pair of normally open switches, and means on said member operable in the movement of the member to one limit position outwardly beyond one of said predetermined positions to close one of said normally open switches and in the movement of the member outwardly beyond the other of said predetermined positions to close said other normally open switch.

7. The combination of a member manually movable in opposite directions between two spaced positions, a variable resistance having an element movable with said member and operable in the movement of the member between said positions in one direction to increase the effective value of the resistance and in the opposite direction to decrease the effective value of the resistance, a normally closed switch, means actuated by said member and operable to open said switch in response to movement of the member outwardly beyond one of said spaced positions to a predetermined position, a normally open switch, and means actuated by said member and operable to close said normally open switch in the movement of the member to a limit position outwardly beyond said predetermined position.

8. The combination of a member manually movable in opposite directions in a range defined by two spaced positions, a variable resistance having an element movable with said member and operable in the movement of the member between said positions in one direction to increase the effective value of the resistance and in the opposite direction to decrease the effective value of the resistance, means actuated in response to movement of said member in either direction outwardly beyond said spaced positions to render the element ineffective to vary said resistance, and a pair of normally open switches, means on said member operable in the movement of the member to one limit position outwardly beyond one of said spaced positions to close one of said normally open switches and in the movement of the member outwardly beyond the other of said spaced positions to close said other normally open switch.

THEODORE K. GREENLEE.

REFERENCES CITED

The following references are of record in the file of this patent:

UNITED STATES PATENTS

| Number | Name | Date |
|---|---|---|
| 1,414,709 | Reisbach | May 2, 1922 |
| 2,320,837 | Turner | June 1, 1943 |
| 2,346,437 | Krogh | Apr. 11, 1944 |
| 2,358,338 | Lilja et al. | Sept. 19, 1944 |
| 2,362,977 | Crosthwail et al. | Nov. 21, 1944 |
| 2,490,458 | Feldhausen | Dec. 6, 1949 |